US008457685B1

(12) United States Patent
Bauder et al.

(10) Patent No.: US 8,457,685 B1
(45) Date of Patent: Jun. 4, 2013

(54) METHOD AND SYSTEM FOR INCREASING EFFICIENCY IN A RADIO FRONT-END

(75) Inventors: Ruediger Bauder, Feldkirchen-Westerham (DE); James M. Retz, Cedar Rapids, IA (US)

(73) Assignee: RF Micro Devices, Inc., Greensboro, NC (US)

( * ) Notice: Subject to any disclaimer, the term of this patent is extended or adjusted under 35 U.S.C. 154(b) by 483 days.

(21) Appl. No.: 12/763,659

(22) Filed: Apr. 20, 2010

Related U.S. Application Data

(60) Provisional application No. 61/170,821, filed on Apr. 20, 2009.

(51) Int. Cl.
*H04M 1/00* (2006.01)
*H04B 1/44* (2006.01)

(52) U.S. Cl.
USPC ............................ 455/553.1; 455/78; 455/83

(58) Field of Classification Search
USPC ............... 455/183.1, 82, 552.1, 553.1, 127.1, 455/90.3, 130, 0.73, 272, 296; 333/124, 103
See application file for complete search history.

(56) References Cited

U.S. PATENT DOCUMENTS

| | | | |
|---|---|---|---|
| 5,661,434 A | 8/1997 | Brozovich et al. | |
| 6,271,722 B1 | 8/2001 | Ballantyne | |
| 6,496,083 B1* | 12/2002 | Kushitani et al. | 333/103 |
| 6,900,692 B2 | 5/2005 | Kim et al. | |
| 7,427,894 B2 | 9/2008 | Dow | |
| 8,130,043 B2 | 3/2012 | Arell | |
| 8,324,964 B2 | 12/2012 | Retz et al. | |
| 2002/0183016 A1* | 12/2002 | Kemmochi et al. | 455/83 |
| 2005/0079847 A1* | 4/2005 | Arafa | 455/272 |
| 2005/0280466 A1* | 12/2005 | Gailus et al. | 330/124 R |
| 2006/0223577 A1* | 10/2006 | Ouzillou | 455/553.1 |
| 2007/0222523 A1 | 9/2007 | Arell | |
| 2008/0139157 A1* | 6/2008 | Kerth et al. | 455/296 |
| 2009/0017772 A1* | 1/2009 | Kemmochi et al. | 455/73 |
| 2010/0321129 A1* | 12/2010 | Onody et al. | 333/124 |

OTHER PUBLICATIONS

Teeter, D.A. et al., "Average current reduction in (W)CDMA power amplifiers," 2006 IEEE Radio Frequency Integrated Circuits Symposium, Jun. 11-13, 2006, 4 pp., IEEE.
"RF3171: Quad Band GMSK Polar Edge TXM, 2 UMTS Switch Ports," RFMD Data Sheet No. 100517, 2009, pp. 1-26, R.F. Micro Devices, Inc.
"RF3230: Quad-Band GMSK TXM, 2 UMTS Switch Ports," RFMD Data Sheet No. 100406, 2009, pp. 1-20, R.F. Micro Devices, Inc.

(Continued)

*Primary Examiner* — Nay A Maung
*Assistant Examiner* — Cindy Trandai
(74) *Attorney, Agent, or Firm* — Withrow & Terranova, P.L.L.C.

(57) ABSTRACT

A radio frequency (RF) circuit including control circuitry adapted to select one of multiple modes, including a first transmit mode and a first receive mode. The first receive circuitry is coupled to a first node, and the first node is coupled to a first antenna. During the first receive mode the first receive circuitry is adapted to receive a first RF input signal having a first receive frequency. First power amplifier circuitry including a first final stage provides a first RF output signal having a first transmit frequency for transmission from the first antenna during the first transmit mode. First impedance transformation circuitry is coupled between an output of the first final stage and the first node. During the first receive mode the first final stage is disabled and the first final stage and the first impedance transformation circuitry present a substantially high impedance to the first node.

20 Claims, 11 Drawing Sheets

OTHER PUBLICATIONS

"RF3231: Dual-Band GSM900/DCS1800 Transmit Module with WCDMA Port," RFMD Data Sheet No. 091112, 2009, pp. 1-16, R.F. Micro Devices, Inc.

Non-final Office Action for U.S. Appl. No. 13/013,091 mailed Mar. 9, 2012, 16 pages.

Notice of Allowance for U.S. Appl. No. 13/013,091 mailed Jul. 13, 2012, 7 pages.

Non-final Office Action for U.S. Appl. No. 13/644,089, mailed Nov. 20, 2012, 12 pages.

Non-final Office Action for U.S. Appl. No. 13/644,089, mailed Mar. 12, 2013, 7 pages.

* cited by examiner

METHOD AND SYSTEM FOR INCREASING EFFICIENCY IN A RADIO FRONT-END

This application claims the benefit of provisional patent application Ser. No. 61/170,821, filed Apr. 20, 2009, the disclosure of which is hereby incorporated herein by reference in its entirety.

FIELD OF THE INVENTION

Embodiments of the disclosure relate to radio frequency (RF) front end modules, and in particular to the use of impedance transformation circuitry to reduce or eliminate insertion losses associated with switches.

BACKGROUND OF THE INVENTION

A multimode multiband cellular handset operates on multiple frequency bands, allowing a single handset to be used on different cellular networks and in different geographic locations and countries. A multimode multiband handset typically includes a front end module that has separate transmit and receive circuitry for each frequency band, and relatively complex high power switching circuitry that couples the handset's antenna to the appropriate receiver or transmitter depending on the particular mode in which the handset is operating. Due to voltage drops across RF switches when closed, this complex switching circuitry can add significant insertion loss to the path of a transmitter's power amplifier, increasing amplification power requirements, which in turn reduces the handset's battery charge and thus the talk time capability of the handset. Moreover, such complex switches are relatively high cost components. Thus, there is a need for reducing the insertion loss caused by complex high power switching circuitry in a multimode multiband handset.

SUMMARY OF THE INVENTION

The present invention relates to a radio frequency (RF) circuit that includes impedance transformation circuitry to present a substantially high impedance to a node during a receive mode of the circuit. The impedance transformation circuitry isolates a power amplifier from the receive signal path during the receive mode without the use of a switch. According to one embodiment, power amplifier circuitry is coupled to a first node, which is coupled to an antenna. Impedance transformation circuitry is coupled between a final stage of the power amplifier circuitry and the first node. Receive circuitry may be coupled to the first node via a first receive switch. During a transmit mode, the first receive switch may be open, thus eliminating a load that would otherwise be presented by the receive circuitry during the transmit mode. During the receive mode, the first receive switch is closed, and the impedance transformation circuitry presents a substantially high impedance to the first node, thereby isolating the power amplifier from the receive signal path during the receive mode. Among other advantages, the impedance transformation circuitry eliminates the use of a relatively complex high power switch in the path between the final output stage of the power amplifier and the antenna, reducing insertion loss caused by the ON resistance, and reducing the cost associated with high power switch.

In one embodiment, the impedance transformation circuitry can include an impedance rotation circuit, a matching circuit, and a reactance compensation circuit. The impedance rotation circuit is adapted to provide a substantially high impedance at the receive frequency of the receive circuitry. The reactance compensation circuit compensates for reactive parasitics at the output of the first final stage of the power amplifier when the first final stage is disabled. Ideally, the reactance compensation circuit transforms the reactive parasitics into non-reactive parasitics. The matching circuit provides an impedance match between the output of the final stage of the power amplifier and the antenna.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
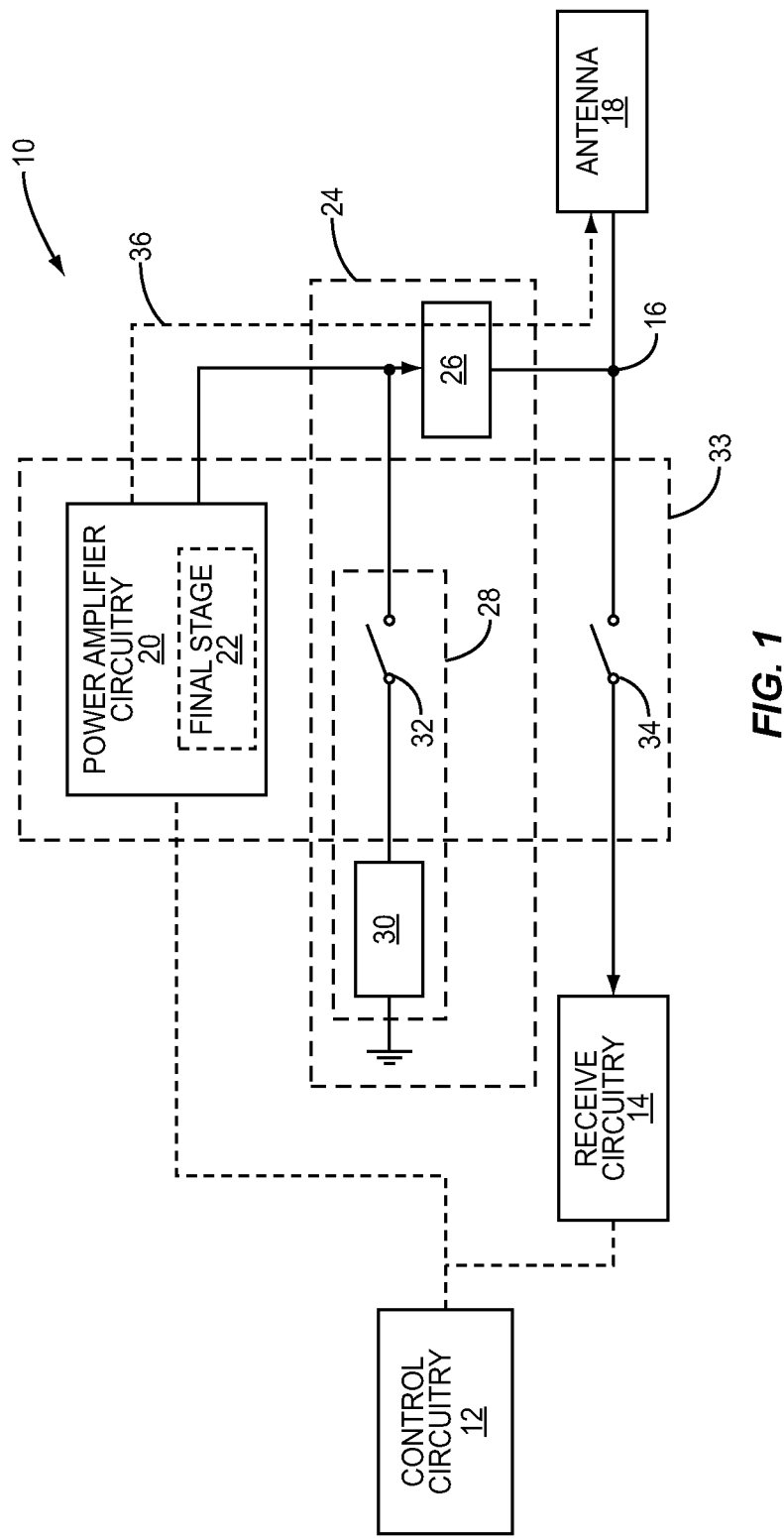
FIG. 1 is a block diagrams of a radio frequency (RF) circuit according to one embodiment.

FIG. 1 is a block diagram of a radio frequency (RF) circuit 10 according to one embodiment. The RF circuit 10 includes control circuitry 12 that can select one of a plurality of modes of the RF circuit 10, including a first transmit mode and a first receive mode. First receive circuitry 14 is coupled to a first node 16, which in turn is coupled to a first antenna 18. During the first receive mode, the first receive circuitry 14 is adapted to receive from the first antenna 18 a first RF input signal having a first receive frequency.

The RF circuit 10 also includes first power amplifier circuitry 20 that includes a first final stage 22. During the first transmit mode, the first final stage 22 provides a first RF output signal having a first transmit frequency for transmission from the first antenna 18. First impedance transformation circuitry 24 is coupled between an output of the first final stage 22 and the first node 16. During the first receive mode the first final stage 22 is disabled, and the first final stage 22 and the first impedance transformation circuitry 24 present a substantially high impedance at the first node 16 at the first receive frequency of the first receive circuitry 14. In one embodiment, the substantially high impedance at the first node 16 may function to substantially minimize desensitization of the first receive circuitry at the first receive frequency. In another embodiment, the substantially high impedance is about five times the characteristic impedance of a system. For example, if the characteristic impedance of the system is 50 ohms, first impedance transformation circuitry 24 may present about a 250 ohm-300 ohm impedance.

In one embodiment, the first impedance transformation circuitry 24 includes an impedance rotation and matching circuit 26 and reactance compensation circuitry 28. The impedance rotation and matching circuit 26 is adapted to provide a substantially high impedance at the receive frequency of the first receive circuitry 14, and to provide an impedance match between the output of the first final stage 22 of the first power amplifier circuitry 20 and the first antenna 18. The reactance compensation circuitry 28 may include a reactance compensation circuit 30 and a switch 32 coupled in series between ground and the output of the first final stage 22. During the first transmit mode, the switch 32 is open. During the first receive mode, the switch 32 is closed, and the reactance compensation circuit 30 compensates for the reactive parasitics at the output of the first final stage 22 when the first final stage 22 is disabled. Ideally, the reactance compensation circuitry 28 transforms the reactive parasitics into non-reactive parasitics. Since the output impedance of the first final stage 22 during transmit mode is typically much lower than the impedance of the antenna 18, one advantage to coupling the switch 32 at the output of the first final stage 22 instead of to the first node 16 is that the voltage swing across the switch 32 when the switch is open is relatively low. Therefore, the switch 32 may not need to be a rugged switch, and can be implemented on a semiconductor die 33 more easily along with the first final stage 22.

A switch 34 may be coupled between the first receive circuitry 14 and the first node 16. During the first transmit mode, the switch 34 is open, isolating the first receive circuitry 14 from the first node 16. During the first receive mode, the first final stage 22 and the first impedance transformation circuitry 24 present a substantially high impedance to the first node 16 at the first receive frequency of the first receive circuitry 14. Notably, the first impedance transformation circuitry 24 may entirely eliminate switches in the RF signal path 36 between the first final stage 22 and the first antenna 18. The switch 34 may also be implemented on the semiconductor die 33.

Figure 2:
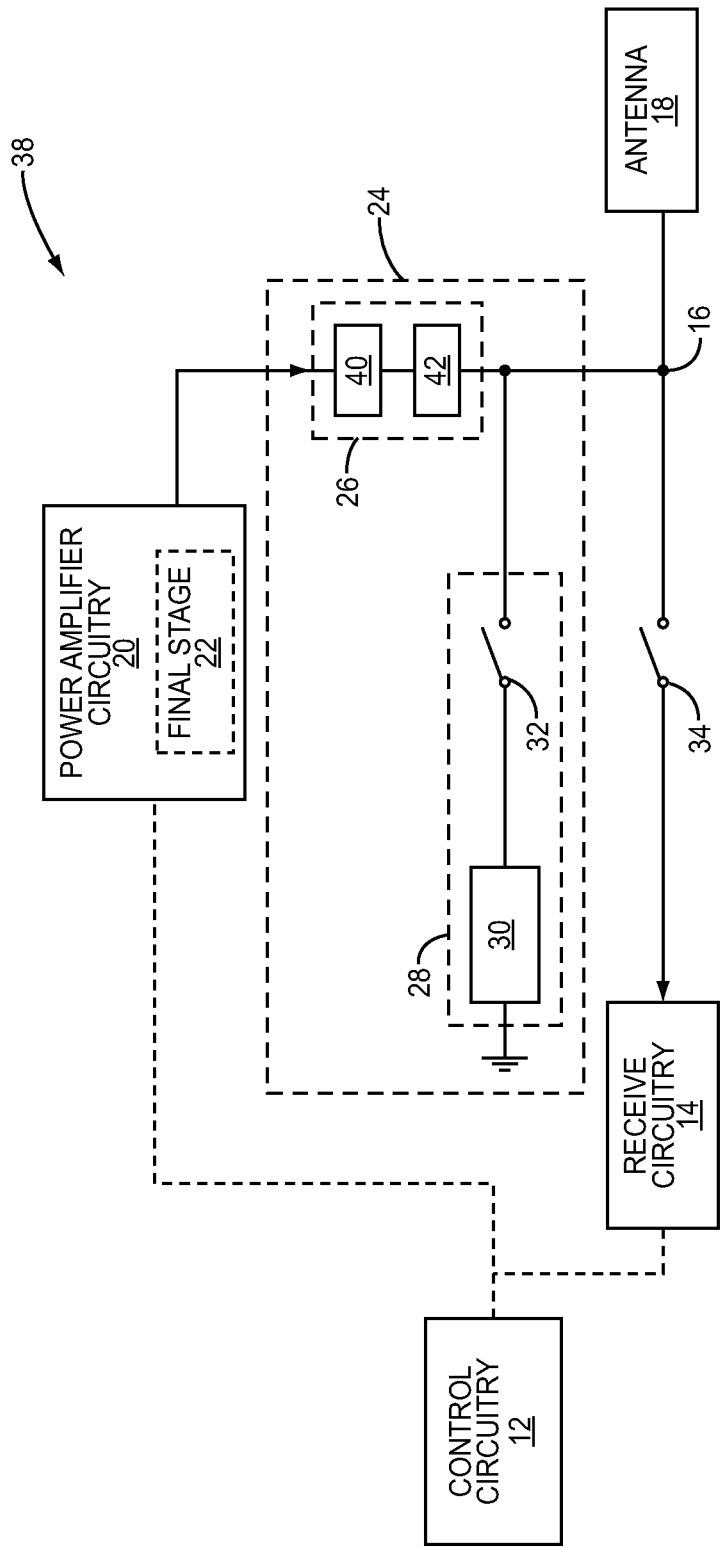
FIG. 2 illustrates a block diagram of an RF circuit according to another embodiment.

FIG. 2 is a block diagram of a RF circuit 38 according to another embodiment. Notably, in the RF circuit 38, the switch 32 may be coupled in series with the reactance compensation circuit 30 between the ground and the first node 16. If the switch 32 is coupled between the ground and the first node 16, the switch 32 is preferably a stacked switch to withstand the voltage swing at the first node 16 during the first transmit mode when the switch 32 is open.

The impedance rotation and matching circuit 26 comprises a matching circuit 40 and an impedance rotation circuit 42. The matching circuit 40 may comprise, for example, a Pi ladder network to provide an impedance match between the output of the first final stage 22 and the first antenna 18. The impedance rotation circuit 42 may comprise, for example, a transmission line that rotates the phase of an RF signal at the first receive frequency to create a substantially high impedance at the first node 16.

Embodiments of the present invention may be used to implement a radio front end suitable for second generation (2G) wireless systems, third generation (3G) wireless systems, fourth generation (4G) wireless systems, combinations thereof, and other suitable wireless systems. Multi-mode multi-band handsets are increasingly popular since such handsets allow a user to communicate over a broad spectrum of wireless networks in many geographic locations. Unfortunately, the front end modules of such multi-mode multi-band handsets typically use complex switching circuitry to select a desired mode and band. Such circuitry causes significant insertion loss in the transmit paths of the power amplifiers used in such handsets. The present invention can be used to reduce, or eliminate, switches in the transmit paths of power amplifiers.

As used herein the phrase "highband frequency" means an RF frequency that is in excess of about 1400 MHZ, such as the GSM DCS 1800 and PCS 1900 frequency bands, and the phrase "lowband" frequency means an RF frequency that is less than about 1400 MHZ, such as the GSM 850 and GSM 900 frequency bands. Generally, a ratio of the highband frequencies to the lowband frequencies are an order of about two to one (e.g., the highband GSM DCS 1800 frequency band to the lowband GSM 900 frequency band) or three to one. As will be discussed herein, the RF circuitry of the present invention may be used with multiple highband and lowband power amplifier circuits and multiple highband and lowband receive circuits.

Figure 3:
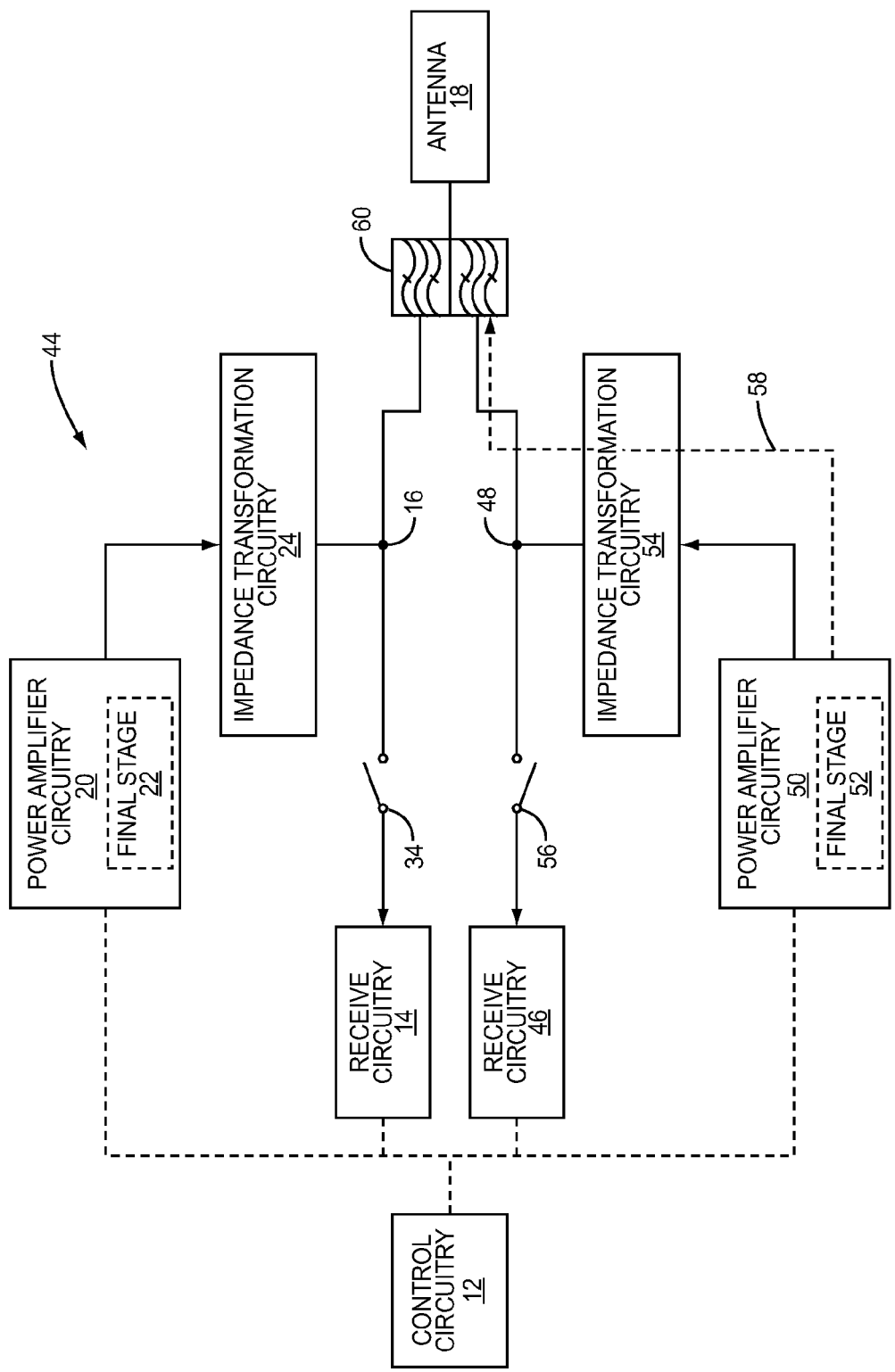
FIG. 3 illustrates an RF circuit according to yet another embodiment.

FIG. 3 illustrates an RF circuit 44 according to another embodiment. The RF circuit 44 includes control circuitry 12 that can select one of a plurality of modes of the RF circuit 44, including first and second transmit modes, and first and second receive modes. Second receive circuitry 46 is coupled to a second node 48, which in turn is coupled to the first antenna 18. During the second receive mode, the second receive circuitry 46 is adapted to receive from the first antenna 18 a second RF input signal having a second receive frequency.

The RF circuit 44 also includes second power amplifier circuitry 50 that includes a second final stage 52. During the second transmit mode, the second final stage 52 provides a second RF output signal having a second transmit frequency for transmission from the first antenna 18. Second impedance transformation circuitry 54 is coupled between an output of the second final stage 52 and the second node 48.

A switch 56 may be coupled between the second receive circuitry 46 and the second node 48. During the second transmit mode, the switch 56 is open, isolating the second receive circuitry 46 from the second node 48. During the second receive mode, the second final stage 52 and the second impedance transformation circuitry 54 present a substantially high impedance to the second node 48 at the second receive frequency of the second receive circuitry 46. Notably, the second impedance transformation circuitry 54 may entirely eliminate switches in the RF signal path 58 between the second final stage 52 and the first antenna 18.

A diplexer 60 is preferably coupled between the first node 16 and the first antenna 18 and between the second node 48 and the first antenna 18. In one embodiment, the first antenna 18 is a wideband antenna capable of receiving and transmitting both highband and lowband frequencies. For example, the first transmit frequency and the first receive frequency may be highband frequencies, and the second transmit frequency and the second receive frequencies may be lowband frequencies. For example, the first transmit frequency and the first receive frequency may comprise DCS 1800 highband frequencies, and the second transmit frequency and the second receive frequencies may comprise GSM 900 lowband frequencies. The diplexer 60 separates the highband frequencies from the lowband frequencies.

Figure 4A:
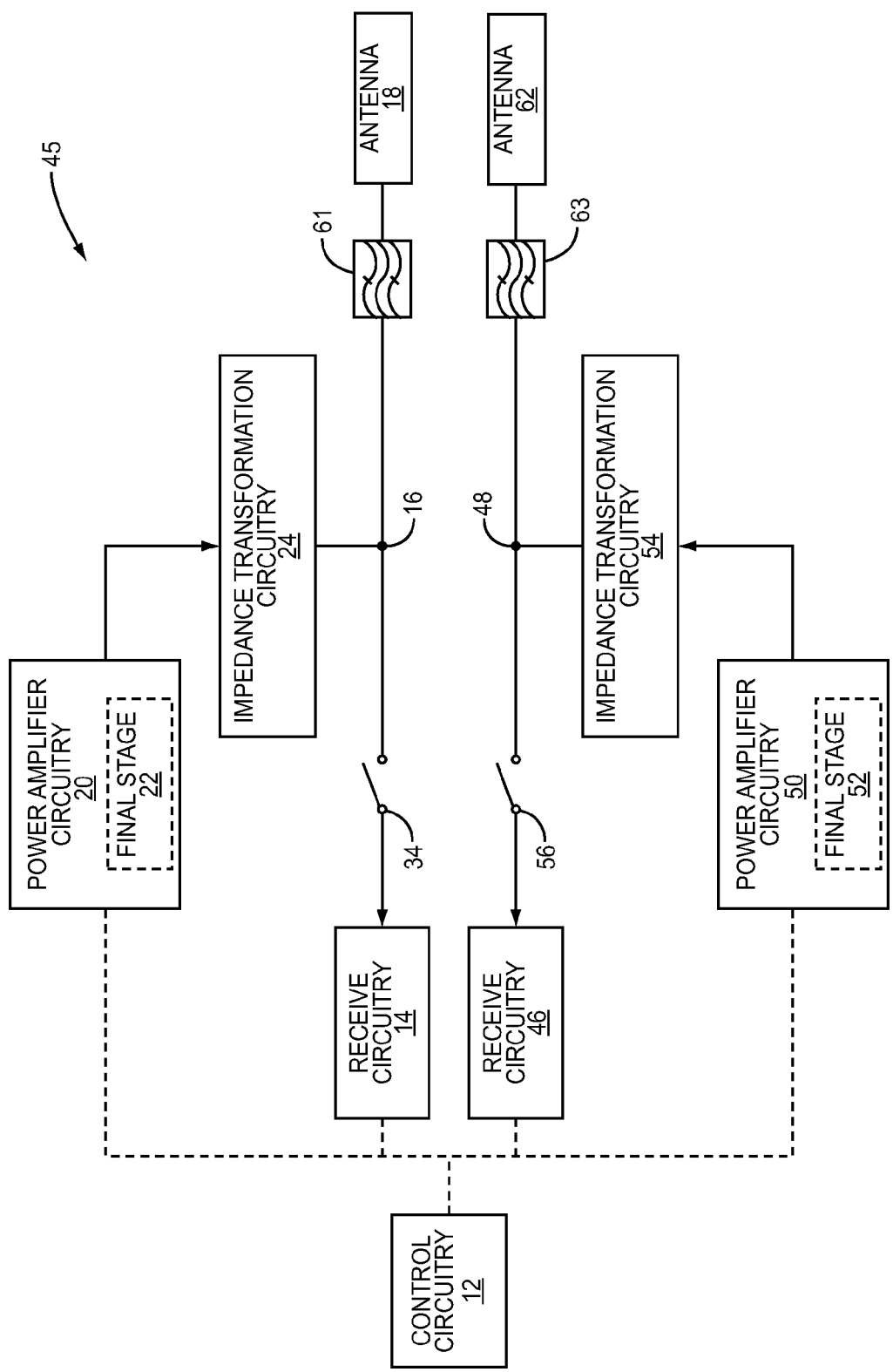
FIGS. 4A-4C illustrate RF circuits according to other embodiments.

FIG. 4A illustrates an RF circuit 45 according to another embodiment. The RF circuit 45 includes the control circuitry 12 that can select one of a plurality of modes of the RF circuit 45, including first, second, third and fourth transmit modes, and first, second, third and fourth receive modes. The RF circuit 45 may use transceiver selectivity, for example, to implement quad band 2G functionality. In this embodiment, the first antenna 18 may comprise a highband antenna. The first receive circuitry 14 and first power amplifier circuitry 20 may be coupled to the first antenna 18 via a bandpass filter 61. Thus, the first and third transmit frequencies and first and third receive frequencies may be highband frequencies. The second receive circuitry 46 and the second power amplifier circuitry 50 may be coupled to a second antenna 62 via a bandpass filter 63. In this embodiment, the second antenna 62 may comprise a lowband antenna. Thus, the second and fourth transmit frequencies and second and fourth receive frequencies may be lowband frequencies. A transceiver (not illustrated) may perform selectivity to enable the first receive circuitry 14 to receive a signal on either of two different highband frequencies, and the first power amplifier circuitry 20 to transmit a signal on either of two highband frequencies, depending on the current mode. The second antenna 62 may be a lowband antenna, and thus, the second transmit frequency and second receive frequency may be lowband frequencies. The transceiver may perform selectivity to enable the second receive circuitry 46 to receive a signal on either of two different lowband frequencies, and the second power amplifier circuitry 50 to transmit a signal on either of two lowband frequencies, again depending on the current mode.

Figure 4B:
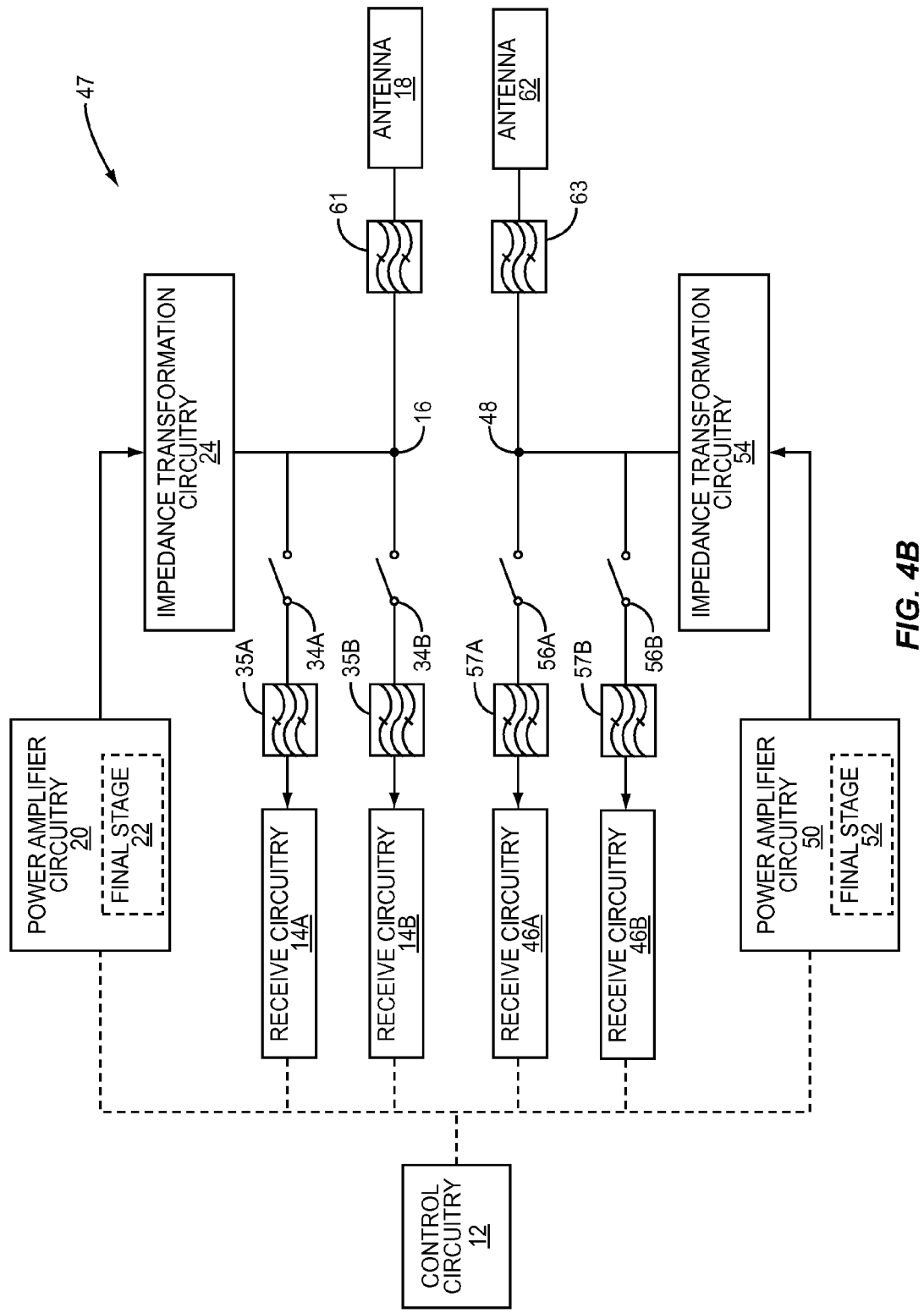

FIG. 4B illustrates an RF circuit 47 according to another embodiment. The RF circuit 47 may be used for example, to implement quad band 2G functionality. The RF circuit 47 includes the control circuitry 12 that can select one of a plurality of modes of the RF circuit 47, including first, second, third and fourth transmit modes, and first, second, third and fourth receive modes. Switches 34A, 34B selectively couple a receive circuitry 14A or receive circuitry 14B to the highband first antenna 18 depending on the current mode. Surface acoustic wave (SAW) bandpass filters 35A, 35B respectively pass the desired highband frequency signal to the respective receive circuitry 14A, 14B. A transceiver (not illustrated) may perform selectivity to enable the first power amplifier circuitry 20 to transmit a signal on either of two highband frequencies.

Switches 56A, 56B selectively couple a receive circuitry 46A or receive circuitry 46B to the lowband second antenna 62 depending on the current mode. SAW bandpass filters 57A, 57B respectively pass the desired lowband frequency to the respective receive circuitry 46A, 46B. The transceiver may perform selectivity to enable the second power amplifier circuitry 50 to transmit a signal on either of two lowband frequencies.

Figure 4C:
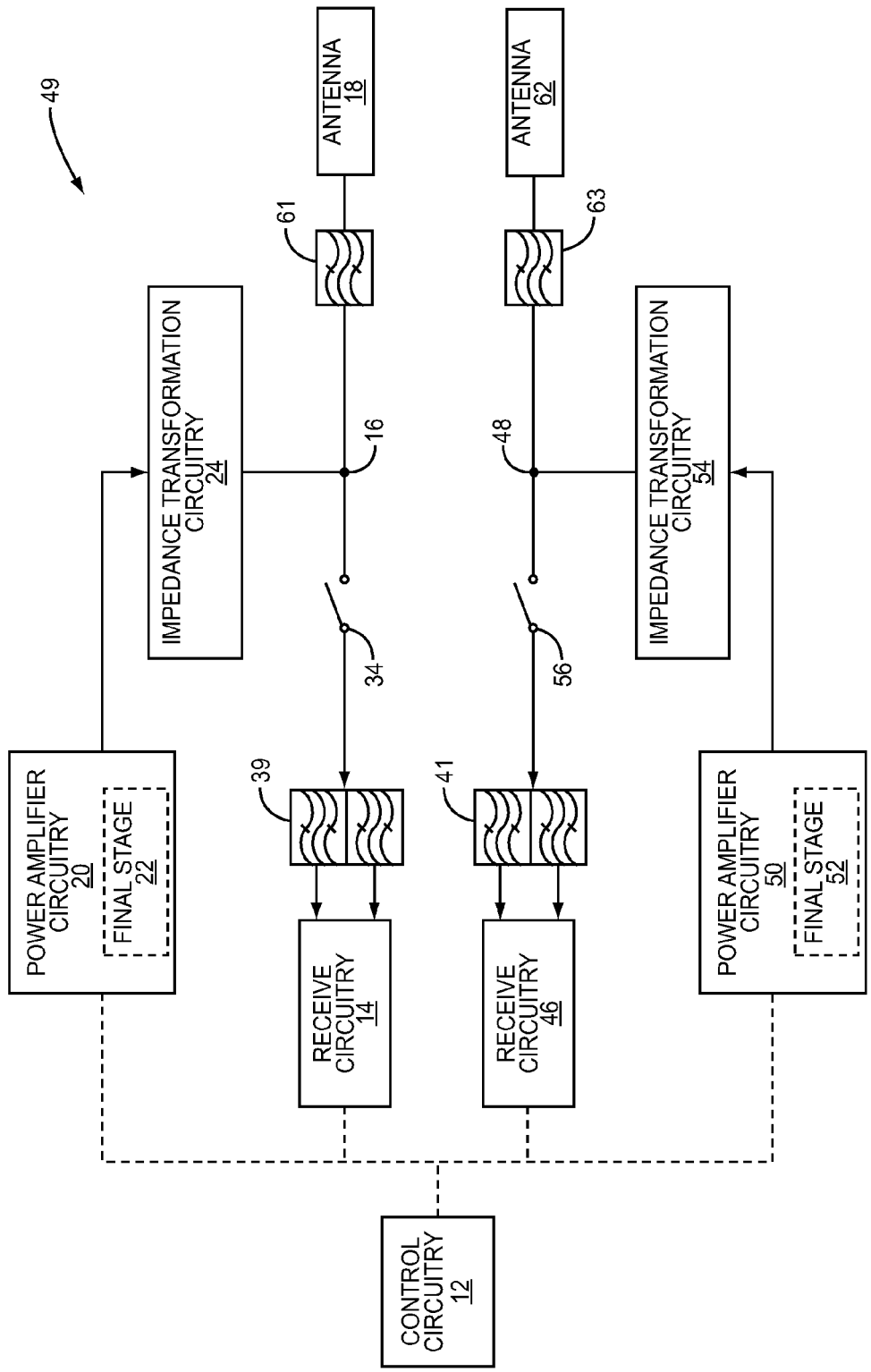

FIG. 4C illustrates an RF circuit 49 according to another embodiment. The RF circuit 49 may also be used, for example, to implement quad band 2G functionality. The RF circuit 49 includes the control circuitry 12 that can select one of a plurality of modes of the RF circuit 49, including first, second, third and fourth transmit modes, and first, second, third and fourth receive modes. A single switch 34 couples lowband signals to a diplexed SAW bank 39, which passes the appropriate signals, depending on the current mode, at the appropriate signals, depending on the current mode, at the desired frequency to the first receive circuitry 14. Similarly a single switch 56 couples highband signals to a diplexed SAW bank 41, which passes the appropriate signals, depending on the current mode, at the desired frequency to the second receive circuitry 46. A transceiver (not illustrated) may perform selectivity to enable the first power amplifier circuitry 20 to transmit a signal on either of two highband frequencies, depending on the current mode, and the second power amplifier circuitry 50 to transmit a signal on either of two lowband frequencies, depending on the current mode.

Figure 5:
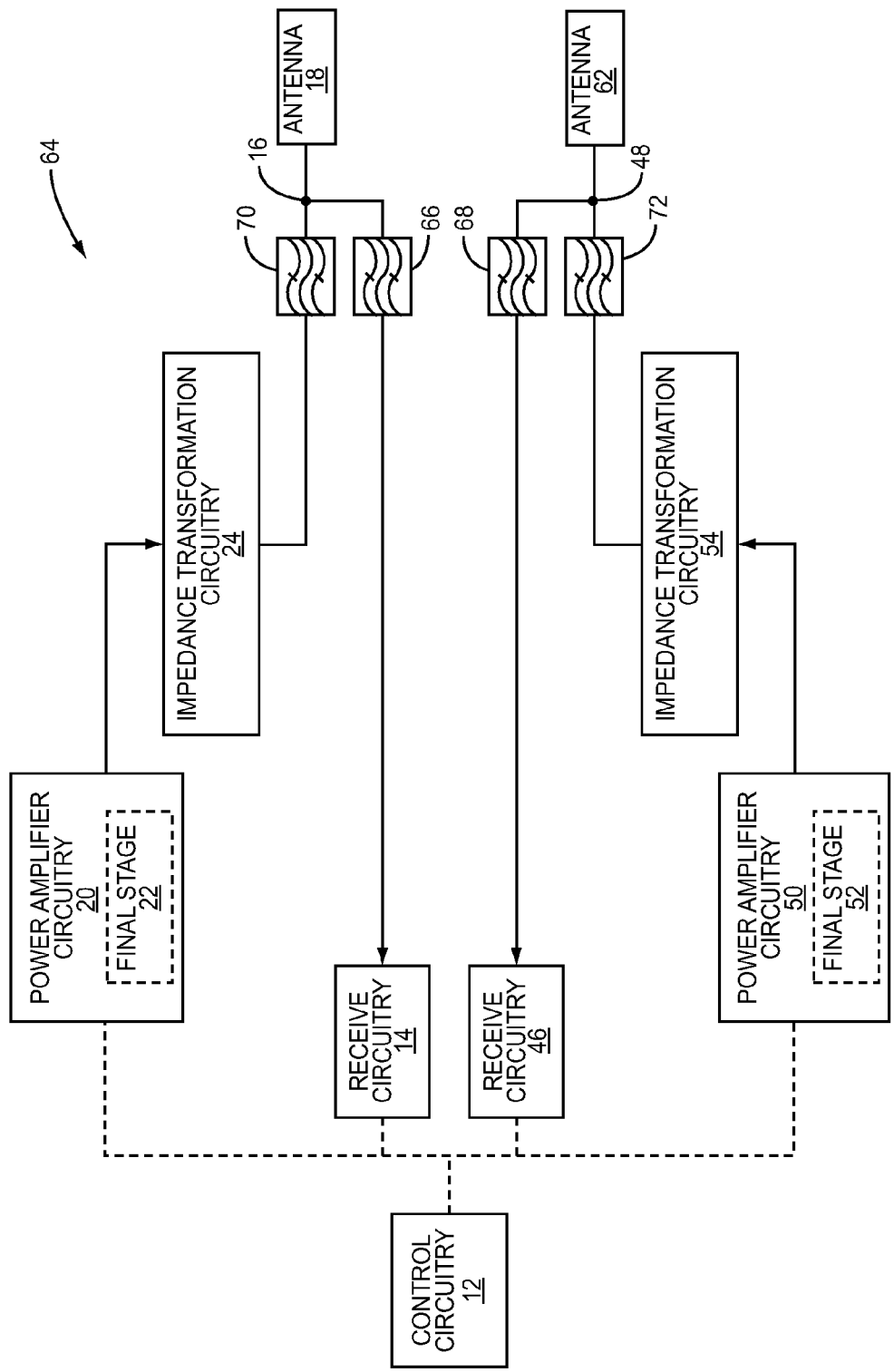
FIG. 5 illustrates an RF circuit according to another embodiment.

FIG. 5 illustrates an RF circuit 64 according to another embodiment. A first bandpass filter 66 may be coupled in series between the first receive circuitry 14 and the first node 16. During the first transmit mode, the first bandpass filter 66 is adapted to present a substantially high impedance to the first node 16. The first bandpass filter 66 may comprise, for example, a surface acoustic wave (SAW) filter. A second bandpass filter 68 may be coupled in series between the second receive circuitry 46 and the second node 48. During the second transmit mode, the second bandpass filter 68 is adapted to present a substantially high impedance to the second node 48. The second bandpass filter 68 may also comprise, for example, a SAW filter. A harmonic trap filter 70 may be coupled in series between the first impedance transformation circuitry 24 and the first node 16 to eliminate harmonic frequencies during the first transmit mode. Similarly, harmonic trap filter 72 may be coupled in series between the second impedance transformation circuitry 54 and the second node 48 to eliminate harmonic frequencies during the second transmit mode.

The first antenna 18 may comprise a wideband antenna. The first transmit frequency may be a highband frequency and the first receive frequency may be a lowband frequency. Using a highband transmit frequency and a lowband receive frequency with the first antenna may eliminate a need for a relatively costly switch.

Similarly, the second antenna 62 may comprise a wideband antenna. The second transmit frequency may be a lowband frequency and the second receive frequency may be a highband frequency. Notably, the RF circuit 64 implements dual band functionality with no switches in the transmit or receive signal paths at any frequency.

Figure 6:
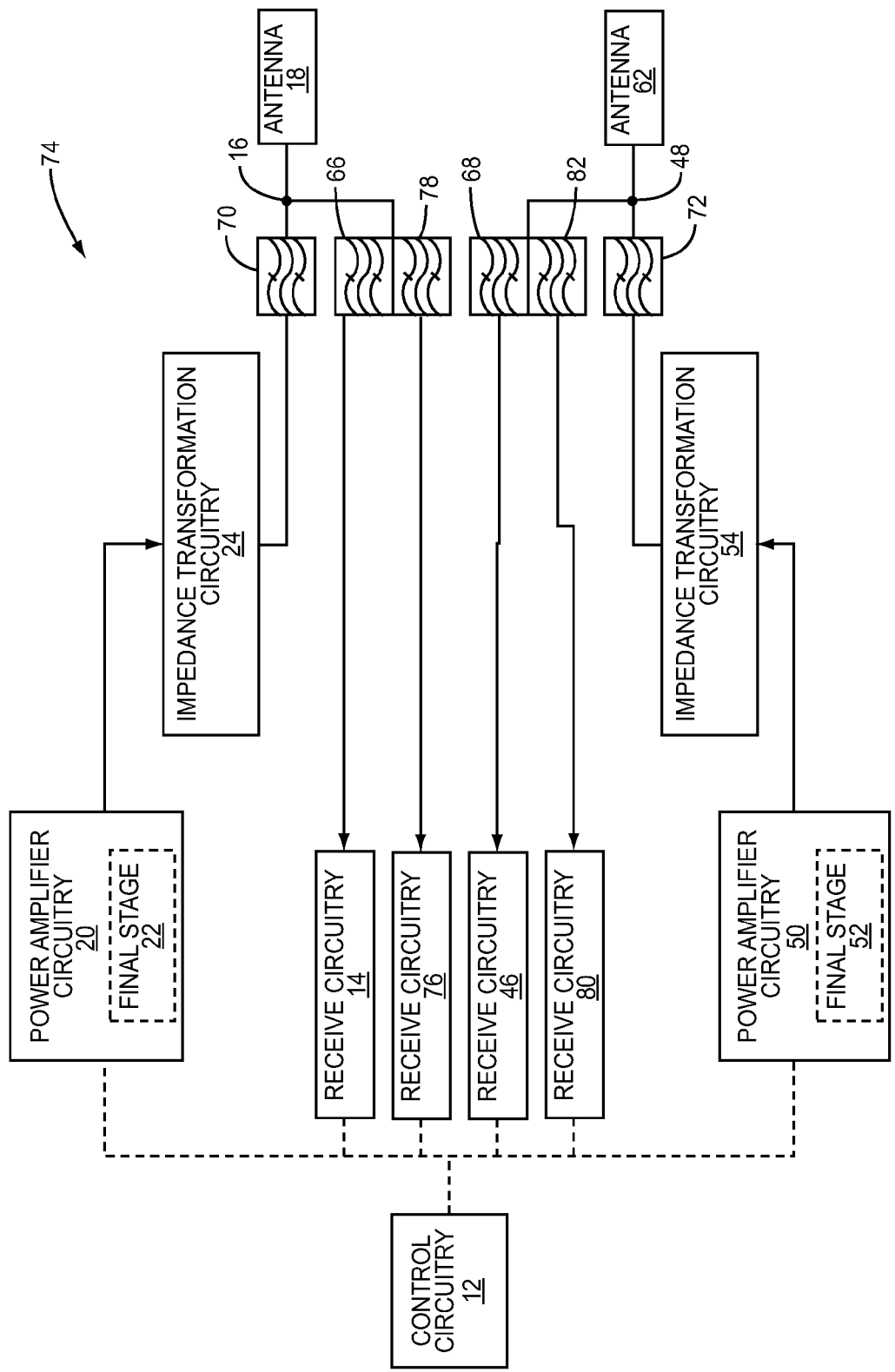
FIG. 6 illustrates an RF circuit implementing quad band functionality according to one embodiment.

FIG. 6 illustrates an RF circuit 74 implementing quad band functionality according to one embodiment. The RF circuit 74 includes the control circuitry 12 that can select one of a plurality of modes of the RF circuit 74, including first, second, third and fourth transmit modes, and first, second, third and fourth receive modes. Third receive circuitry 76 and a third bandpass filter 78 are coupled in series to the first node 16. During the first transmit mode, the third bandpass filter 78 and the first bandpass filter 66 are adapted to present a substantially high impedance to the first node 16. Fourth receive circuitry 80 and a fourth bandpass filter 82 are coupled in series to the second node 48. During the second transmit mode, the fourth bandpass filter 82 and the second bandpass filter 62 are adapted to present a substantially high impedance to the first node 16. In one embodiment, a first duplexer provides the first bandpass filter 66 and the third bandpass filter 78, and a second duplexer provides the second bandpass filter 68 and the fourth bandpass filter 82.

In one embodiment the first transmit frequency is a highband frequency, and the first and third receive frequencies are lowband frequencies. The second transmit frequency may be a lowband frequency, and the second and fourth receive frequencies may be highband frequencies. The first power amplifier circuitry 20 may be able to transmit at either of two different highband frequencies, and the second power amplifier circuitry 50 may be able to transmit on two different lowband frequencies. Thus, the RF circuit 74 implements quad band functionality (e.g., four transmit frequencies and four receive frequencies) with no switch in series between any receive or power amplifier circuitry and an antenna.

In one embodiment, for example, the first power amplifier circuitry 20 may transmit at DCS 1800 and PCS 1900 highband frequencies. The first receive frequency may comprise a GSM 850 lowband frequency, and the third receive frequency may comprise a GSM 900 lowband frequency. The second power amplifier circuitry 50 may transmit at GSM 850 and GSM 900 lowband frequencies. The second receive frequency may comprise a DCS 1800 highband frequency, and the fourth receive frequency may comprise a PCS 1900 highband frequency.

Figure 7:
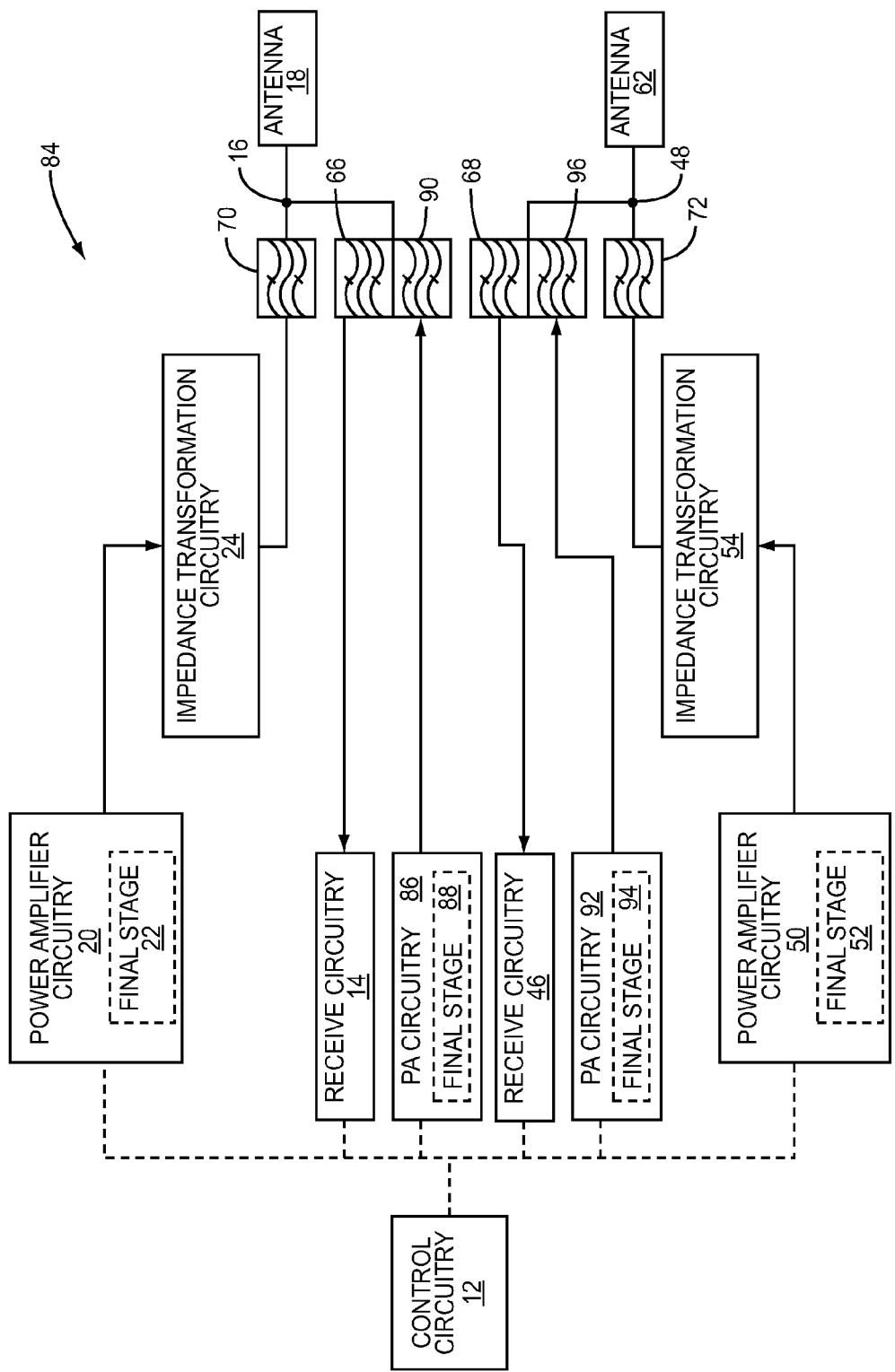
FIG. 7 illustrates an RF circuit implementing quad band functionality according to another embodiment.

FIG. 7 illustrates an RF circuit 84 implementing quad band functionality according to another embodiment. In this embodiment, two 2G modes are implemented and two full duplex 3G modes are implemented. The RF circuit 84 includes the control circuitry 12 that can select one of a plurality of modes of the RF circuit 84, including first, second, third and fourth transmit modes, and first, second, third and fourth receive modes. The RF circuit 84 includes third power amplifier circuitry 86 that includes a third final stage 88. The third power amplifier circuitry 86 and a third bandpass filter 90 are coupled in series to the first node 16. During the third transmit mode, the third final stage 88 provides a third RF output signal having a third transmit frequency for transmission from the first antenna 18. During the first transmit mode, the third bandpass filter 90 and first bandpass filter 66 are adapted to present a substantially high impedance to the first node 16.

The RF circuit 84 also includes fourth power amplifier circuitry 92 that includes a fourth final stage 94. The fourth power amplifier circuitry 92 and a fourth bandpass filter 96 are coupled in series to the second node 48. During the fourth transmit mode, the fourth final stage 94 provides a fourth RF output signal having a fourth transmit frequency for transmission from the second antenna 62. During the second transmit mode, the fourth bandpass filter 96 is adapted to present a substantially high impedance to the second node 48. In one embodiment, a first duplexer provides the first bandpass filter 66 and the third bandpass filter 90, and a second duplexer provides the second bandpass filter 68 and the fourth bandpass filter 96. During the second transmit mode, the second bandpass filter 68 and fourth bandpass filter 96 are adapted to present a substantially high impedance to the second node 48.

The first power amplifier circuitry 20 may generate the first transmit frequency at a 2G highband frequency. The first receive circuitry 14 may handle multiple receive modes, and process both 2G and 3G signals at or near the same lowband frequency, for example. The third power amplifier circuitry 86 may generate the third transmit frequency at a 3G lowband frequency. The first receive circuitry 14 and the third power amplifier circuitry 86 may operate in a full duplex mode.

The second power amplifier circuitry 50 may generate the second transmit frequency at a 2G lowband frequency. The second receive circuitry 46 may handle multiple receive modes, and may process both 2G and 3G signals at or near the same highband frequency, for example. The fourth power amplifier circuitry 92 may generate the fourth transmit frequency at a 3G highband frequency. The second receive circuitry 46 and the fourth power amplifier circuitry 92 may operate in a full duplex mode. In this manner, the RF circuit 84 provides quad band 2G and 3G functionality with no switches in the transmit or receive signal paths at any frequency.

Figure 8:
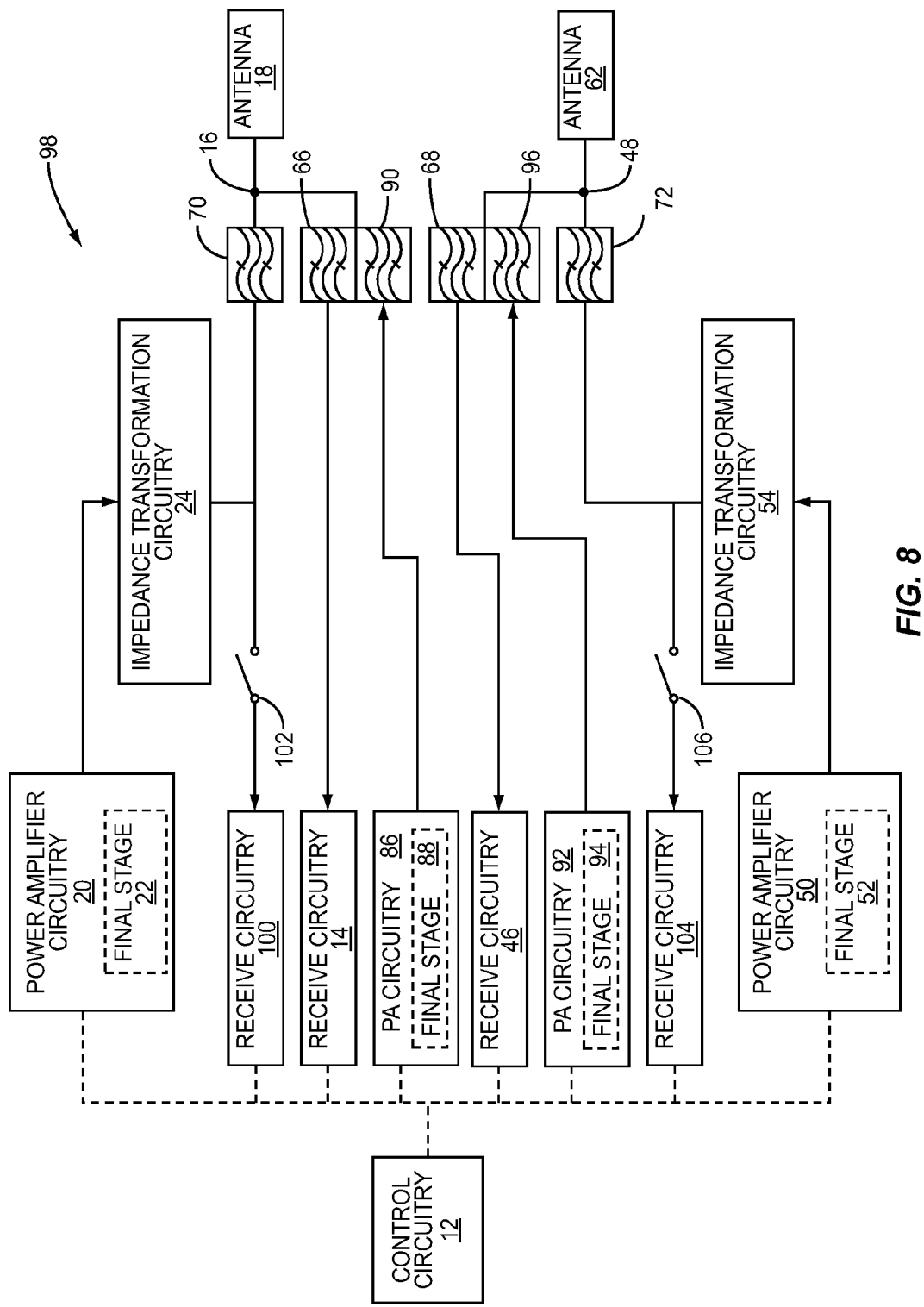
FIG. 8 illustrates an RF circuit implementing dual band 3G and quad band 2G functionality according to another embodiment.

FIG. 8 illustrates an RF circuit 98 implementing dual band 3G and quad band 2G functionality according to another embodiment. In this embodiment, two 3G modes are implemented and four 3G modes are implemented. The RF circuit 94 includes the control circuitry 12 that can select one of a plurality of modes of the RF circuit 98, including first, second, third and fourth transmit modes, and first, second, third and fourth receive modes.

The RF circuit 98 includes third receive circuitry 100 and a first receive switch 102 coupled in series to the first node 16. During the third receive mode the third receive circuitry 100 is adapted to receive a third RF input signal having a third receive frequency. During both of the first transmit mode and the third transmit mode the first receive switch 102 is open and during the third receive mode the first receive switch 102 is closed.

The RF circuit 98 includes fourth receive circuitry 104 and a second receive switch 106 coupled in series to the second node 48. During the fourth receive mode the fourth receive circuitry 104 is adapted to receive a fourth RF input signal having a fourth receive frequency. During both of the second transmit mode and the fourth transmit mode the second receive switch 106 is open and during the fourth receive mode the second receive switch 106 is closed.

The first power amplifier circuitry 20 may generate the first transmit frequency at a 2G highband frequency. The third receive circuitry 100 may process highband frequency 2G signals. The first receive circuitry 14 may handle multiple receive modes, and process both 2G and 3G signals at or near the same lowband frequency, for example. The third power amplifier circuitry 86 may generate the third transmit frequency at a 3G lowband frequency.

The second power amplifier circuitry 50 may generate the second transmit frequency at a 2G lowband frequency. The fourth receive circuitry 104 may process lowband frequency 2G signals. The second receive circuitry 46 may handle multiple receive modes, and may process both 2G and 3G signals at or near the same highband frequency, for example. The fourth power amplifier circuitry 92 may generate the fourth transmit frequency at a 3G highband frequency. In this manner, the RF circuit 98 provides quad band 2G and dual band 3G functionality with only two switches in two receive signal paths.

Figure 9:
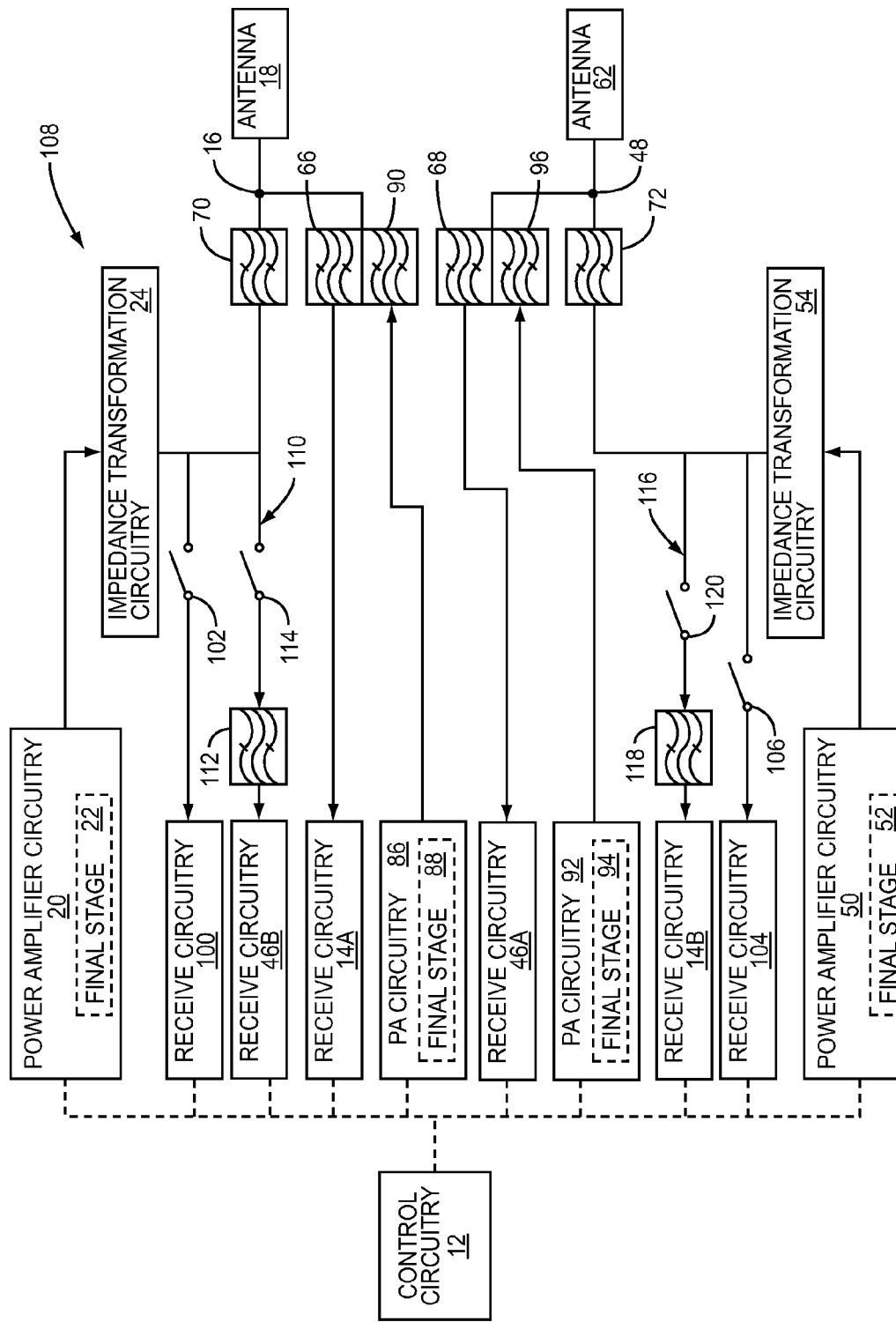
FIG. 9 illustrates an RF circuit implementing dual band 3G and quad band 2G functionality, along with 3G diversity according to another embodiment.

FIG. 9 illustrates an RF circuit 108 implementing dual band 3G and quad band 2G functionality, along with 3G diversity according to another embodiment. In this embodiment, two 3G modes are implemented and four 2G modes are implemented. The RF circuit 108 includes a highband 3G signal diversity path 110 that includes a receive circuitry 46B, a harmonic trap 112 and first diversity switch 114 coupled in series to the first node 16. The receive circuitry 46B operates in conjunction with receive circuitry 46A to provide highband signal diversity. Both the receive circuitry 46A and 46B receive the same highband 3G frequency, and independently downconvert and post process respective input signals. After post processing, the input signals are recombined, resulting in significant receive system gain and eliminating a relatively large portion of RF channel effects in the air interface path.

Similarly, the RF circuit 108 includes a lowband 3G signal diversity path 116 that includes a receive circuitry 14B, harmonic trap 118 and second diversity switch 120 coupled in series to the second node 48. The receive circuitry 14B operates in conjunction with receive circuitry 14A to provide lowband signal diversity. Both the receive circuitry 14A and 14B receive the same lowband 3G frequency, and independently downconvert and post process respective input signals. After post processing, the input signals are recombined, resulting in significant receive system gain and eliminating a relatively large portion of RF channel effects in the air interface path.

Those skilled in the art will recognize improvements and modifications to the preferred embodiments of the present invention. The signals discussed herein may be single ended, differential, or a combination thereof. All such improvements and modifications are considered within the scope of the concepts disclosed herein and the claims that follow.

What is claimed is:

1. A radio frequency (RF) circuit comprising:
control circuitry adapted to select one of a plurality of modes, wherein the plurality of modes includes a first transmit mode and a first receive mode;
first receive circuitry coupled to a first node, wherein the first node is coupled to a first antenna such that during the first receive mode the first receive circuitry is adapted to receive a first RF input signal having a first receive frequency;
first power amplifier circuitry comprising a first final stage, wherein during the first transmit mode the first final stage provides a first RF output signal having a first transmit frequency for transmission from the first antenna;
first impedance transformation circuitry coupled between an output of the first final stage and the first node comprising an impedance rotation circuit, an impedance matching circuit, and a reactance compensation circuit coupled to ground, wherein during the first receive mode the first final stage is disabled and the first final stage and the first impedance transformation circuitry present a substantially high impedance to the first node; and
a first switch coupled between the output of the first final stage and the reactance compensation circuit such that the reactance compensation circuit is coupled between the first switch and ground, wherein the first switch is closed during the first receive mode and open during the first transmit mode.

2. The RF circuit of claim 1 wherein no switch is in an RF signal path between the output of the first final stage and the first antenna.

3. The RF circuit of claim 1 further comprising a first switch coupled between the first receive circuitry and the first node, wherein the first switch is closed during the first receive mode and open during the first transmit mode.

4. The RF circuit of claim 1 further comprising a semiconductor die comprising the first final stage and the first switch.

5. The RF circuit of claim 1 wherein the impedance rotation circuit and the impedance matching circuit comprises impedance rotation circuitry and impedance matching circuitry coupled in series between the first final stage and the first node.

6. The RF circuit of claim 1 wherein the plurality of modes further includes a second transmit mode and a second receive mode, the RF circuit further comprising:
second receive circuitry coupled to a second node, wherein during the second receive mode the second receive circuitry is adapted to receive a second RF input signal having a second receive frequency;
a diplexer coupled between the first node and the first antenna and between the second node and the first antenna;
second power amplifier circuitry comprising a second final stage, wherein during the second transmit mode the second final stage provides a second RF output signal having a second transmit frequency for transmission from the first antenna;
second impedance transformation rotation coupled between an output of the second final stage and the second node; and
wherein during the second receive mode the second final stage is disabled and the second final stage and the second impedance transformation rotation present a substantially high impedance at the second node.

7. The RF circuit of claim 6 wherein:
the first receive frequency is a first highband frequency;
the first transmit frequency is a second highband frequency;
the second receive frequency is a first lowband frequency;
the second transmit frequency is a second lowband frequency, and wherein a ratio of the highband frequency to the lowband frequency is on an order of about two to one.

8. The RF circuit of claim 6 further comprising:
a first switch coupled between the first receive circuitry and the first node, wherein the first switch is closed during the first receive mode and open during the first transmit mode; and
a second switch coupled between the second receive circuitry and the second node, wherein the second switch is closed during the second receive mode and open during the second transmit mode.

9. The RF circuit of claim 1 wherein the plurality of modes further includes a second transmit mode and a second receive mode, the RF circuit further comprising:
second receive circuitry coupled to a second node, wherein the second node is coupled to a second antenna such that during the second receive mode the second receive circuitry is adapted to receive a second RF input signal having a second receive frequency;
second power amplifier circuitry comprising a second final stage, wherein during the second transmit mode the second final stage provides a second RF output signal having a second transmit frequency for transmission from the second antenna;
second impedance transformation rotation coupled between an output of the second final stage and the second node; and
wherein during the second receive mode the second final stage is disabled and the second final stage and the second impedance transformation rotation present a substantially high impedance at the second node.

10. The RF circuit of claim 9 further comprising:
a first bandpass filter coupled in series between the first receive circuitry and the first node, wherein during the first transmit mode the first bandpass filter is adapted to present a substantially high impedance to the first node; and
a second bandpass filter coupled in series between the second receive circuitry and the second node, wherein during the second transmit mode the second bandpass filter is adapted to present a substantially high impedance to the second node.

11. The RF circuit of claim 10 wherein:
the first transmit frequency is a first highband frequency;
the first receive frequency is a first lowband frequency;
the second transmit frequency is a second lowband frequency;
the second receive frequency is a second highband frequency, and
wherein a ratio of the highband frequency to the lowband frequency is on an order of about two to one.

12. The RF circuit of claim 10 wherein the plurality of modes further includes a third receive mode and a fourth receive mode, the RF circuit further comprising:
   third receive circuitry and a third bandpass filter coupled in series to the first node such that during the third receive mode the third receive circuitry is adapted to receive a third RF input signal having a third receive frequency, wherein during the first transmit mode the third bandpass filter is adapted to present a substantially high impedance to the first node; and
   fourth receive circuitry and a fourth bandpass filter coupled in series to the second node such that during the fourth receive mode the fourth receive circuitry is adapted to receive a fourth RF input signal having a fourth receive frequency, wherein during the second transmit mode the fourth bandpass filter is adapted to present a substantially high impedance to the second node.

13. The RF circuit of claim 12 wherein a first duplexer provides the first bandpass filter and the third bandpass filter, and a second duplexer provides the second bandpass filter and the fourth bandpass filter.

14. A radio frequency (RF) circuit comprising:
   control circuitry adapted to select one of a plurality of modes, wherein the plurality of modes includes a first transmit mode, a second transmit mode, a third transmit mode, a first receive mode, a second receive mode, and a third receive mode;
   first receive circuitry coupled to a first node, wherein the first node is coupled to a first antenna such that during the first receive mode the first receive circuitry is adapted to receive a first RF input signal having a first receive frequency;
   first power amplifier circuitry comprising a first final stage, wherein during the first transmit mode the first final stage provides a first RF output signal having a first transmit frequency for transmission from the first antenna;
   first impedance transformation circuitry coupled between an output of the first final stage and the first node, wherein during the first receive mode the first final stage is disabled and the first final stage and the first impedance transformation circuitry present a substantially high impedance to the first node
   second receive circuitry coupled to a second node, wherein the second node is coupled to a second antenna such that during the second receive mode the second receive circuitry is adapted to receive a second RF input signal having a second receive frequency;
   second power amplifier circuitry comprising a second final stage, wherein during the second transmit mode the second final stage provides a second RF output signal having a second transmit frequency for transmission from the second antenna;
   second impedance transformation circuitry coupled between an output of the second final stage and the second node, wherein during the second receive mode the second final stage is disabled and the second final stage and the second impedance transformation circuitry present a substantially high impedance at the second node;
   a first bandpass filter coupled in series between the first receive circuitry and the first node, wherein during the first transmit mode the first bandpass filter is adapted to present a substantially high impedance to the first node;
   a second bandpass filter coupled in series between the second receive circuitry and the second node, wherein during the second transmit mode the second bandpass filter is adapted to present a substantially high impedance to the second node;
   third power amplifier circuitry comprising a third final stage and a third bandpass filter coupled in series to the first node wherein during the third transmit mode the third final stage provides a third RF output signal having a third transmit frequency for transmission from the first antenna, wherein during the first transmit mode the third bandpass filter is adapted to present a substantially high impedance to the first node; and
   fourth power amplifier circuitry comprising a fourth final stage and a fourth bandpass filter coupled in series to the second node wherein during the fourth transmit mode the fourth final stage provides a fourth RF output signal having a fourth transmit frequency for transmission from the second antenna, wherein during the second transmit mode the fourth bandpass filter is adapted to present a substantially high impedance to the second node.

15. The RF circuit of claim 14 wherein a first duplexer provides the first bandpass filter and the third bandpass filter, and a second duplexer provides the second bandpass filter and the fourth bandpass filter.

16. The RF circuit of claim 14 wherein:
   the first transmit frequency is a first highband frequency;
   the first receive frequency is a first lowband frequency;
   the third transmit frequency is a second lowband frequency;
   the second transmit frequency is a third lowband frequency;
   the second receive frequency is a second highband frequency;
   the fourth transmit frequency is a third highband frequency, and
   wherein a ratio of the highband frequency to the lowband frequency is on an order of about two to one.

17. The RF circuit of claim 14 wherein the first transmit mode and the second transmit mode operate in a half duplex mode and the third transmit mode and the fourth transmit mode operate in a full duplex mode.

18. The RF circuit of claim 14 wherein no switch is in an RF signal path between any of the:
   first receive circuitry and the first antenna; and
   second receive circuitry and the second antenna.

19. The RF circuit of claim 14 wherein the plurality of modes further includes a fourth receive mode, the RF circuit further comprising:
   third receive circuitry and a first receive switch coupled in series to the first node such that during the third receive mode the third receive circuitry is adapted to receive a third RF input signal having a third receive frequency, wherein during both of the first transmit mode and the third transmit mode the first receive switch is open and during the third receive mode the first receive switch is closed; and
   fourth receive circuitry and a second receive switch coupled in series to the second node such that during the fourth receive mode the fourth receive circuitry is adapted to receive a fourth RF input signal having a fourth receive frequency, wherein during both of the second transmit mode and the fourth transmit mode the second receive switch is open and during the fourth receive mode the first receive switch is closed.

20. A method comprising:
providing:
- first receive circuitry coupled to a first node, wherein the first node is coupled to a first antenna;
- first power amplifier circuitry comprising a first final stage;
- first impedance transformation circuitry coupled between an output of the first final stage and the first node, wherein the first impedance transformation circuitry comprises an impedance rotation circuit, an impedance matching circuit, and a reactance compensation circuit coupled to ground; and
- a first switch coupled between the output of the first final stage and the reactance compensation circuit such that the reactance compensation circuit is coupled between the first switch and ground;

selecting one of a plurality of modes, wherein the plurality of modes includes a first transmit mode and a first receive mode;

during the first receive mode receiving a first RF input signal having a first receive frequency using the first receive circuitry;

during the first transmit mode transmitting a first RF output signal having a first transmit frequency for transmission from the first antenna using the first final stage and opening the first switch;

during the first receive mode disabling the first final stage and closing the first switch; and during the first receive mode presenting a substantially high impedance to the first node using the first final stage and the first impedance transformation circuitry.

* * * * *